United States Patent
Heaton (10) Patent No.: US 7,047,097 B2
(45) Date of Patent: May 16, 2006

(54) HIGH PERFORMANCE CONTROLLER FOR SHIFTING RESONANCE IN MICRO-ELECTRO-MECHANICAL SYSTEMS (MEMS) DEVICES

(75) Inventor: Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 421 days.

(21) Appl. No.: 10/314,746

(22) Filed: Dec. 9, 2002

(65) Prior Publication Data

US 2003/0123046 A1    Jul. 3, 2003

Related U.S. Application Data

(60) Provisional application No. 60/339,629, filed on Dec. 12, 2001.

(51) Int. Cl.
    G06F 19/00    (2006.01)

(52) U.S. Cl. ............ 700/110; 700/121; 700/73; 700/302; 700/303; 700/304; 700/275; 359/224; 359/225; 359/198

(58) Field of Classification Search ........ 700/110, 700/121, 1, 73, 302–304, 275; 359/224–225, 359/198, 877, 341.31, 341.4; 73/488
See application file for complete search history.

(56) References Cited

U.S. PATENT DOCUMENTS

| | | | | |
|---|---|---|---|---|
| 5,444,639 | A | * | 8/1995 | White .................... 708/300 |
| 6,014,285 | A | * | 1/2000 | Okamura .............. 360/78.04 |
| 6,275,326 | B1 | * | 8/2001 | Bhalla et al. ............. 359/298 |
| 6,311,555 | B1 | * | 11/2001 | McCall et al. ............. 73/488 |
| 6,341,259 | B1 | * | 1/2002 | Gutierrez et al. ......... 702/117 |
| 6,574,065 | B1 | * | 6/2003 | Sri-Jayantha et al. ....... 360/75 |
| 6,674,601 | B1 | * | 1/2004 | Ho ........................ 360/75 |

OTHER PUBLICATIONS

Hagelin et al. "Optical raster-scanning displays based on surface-micromachined polysilicon mirrors" Feb. 1999, IEEE Journal of Selected Topics in Quantum Electronics, vol. 5 issue 1, pp. 67-74.*

* cited by examiner

Primary Examiner—Anthony Knight
Assistant Examiner—Thomas Pham
(74) Attorney, Agent, or Firm—W. Daniel Swayze, Jr.; W. James Brady; Frederick J. Telecky, Jr.

(57) ABSTRACT

Devices being controlled electronically via physical manipulation often display a resonance. In many circumstances, the frequency range of operation is not close to the resonance frequency. In these cases, the resonance can be removed through the use of simple compensation techniques such as filters. However, when the resonance frequency is close to the frequency range of operation and when the resonance frequency can change depending on temperature, time, and physical position of the device, simple compensation techniques cannot be used. The present invention presents a non-mechanical technique for providing compensation for devices with a shifting resonance. The non-mechanical technique allows for the compensation to be performed via computation.

26 Claims, 4 Drawing Sheets

HIGH PERFORMANCE CONTROLLER FOR SHIFTING RESONANCE IN MICRO-ELECTRO-MECHANICAL SYSTEMS (MEMS) DEVICES

This application claims priority under 35 USC § 119(e)(1) of provisional application Ser. No. 60/339,629, filed Dec. 12, 2001.

FIELD OF THE INVENTION

This invention relates generally to control systems, and particularly to a controlling a device with a shifting resonance near the operating frequency of the device.

BACKGROUND OF THE INVENTION

Feedback control systems are widely used to control the operation of a wide range of devices with applications ranging from mechanical to electrical. A typical application of a feedback control system (often referred to as a controller) involves manipulating some physical device through the use of a manipulation mechanism, controlled electrically and then taking measurements relating to a physical state/status of the device and then using the measurements for additional information to enhance control of the device.

Precise high-bandwidth control requires a controller that provides suitable stability margins. Conventional compensation techniques (pole/zero cancellation or notch filters) exist for applications where fixed resonances impact the controller design. Conventional compensation techniques do not exist for applications where the resonances shift with position of the mechanical device, time, and/or operating temperature without greatly compromising performance or increase complexity.

One possible solution to the problem of shifting resonance in certain applications is to include a mechanical damping device to the system. The presence of the mechanical damping device will greatly simplify the design of the control system and will permit the use of conventional design techniques. However, the addition of a mechanical damping device to certain precise high-bandwidth systems would greatly complicate the fabrication process even if the addition of the mechanical damping device were possible. For example, in a MEMS device, it is often impossible to integrate a mechanical damping device into the system because the MEMS device is fabricated on a silicon (or a similar substance) substrate.

In MEMS devices, mechanical elements, sensors, actuators, and electronics are integrated on a common silicon substrate through the utilization of micro-fabrication technology. Hence, it can be difficult to include devices such as mechanical dampers. Therefore, it is preferred that solutions to the problem of shifting resonance be electrical and computational solutions in nature.

A need has therefore arisen for a control system that is capable of controlling a mechanical device with a shifting resonance near the operating frequency of the device without the inclusion of a mechanical damping device.

SUMMARY OF THE INVENTION

In one aspect, the present invention provides a method of compensating for a system with a shifting resonance comprising the steps of issuing a command to manipulate a device, detecting the position of the device, computing a compensation value based on the detected position of the device, combining the issued command and the compensation value into another command, and manipulating the device based on the new command.

The present invention provides a number of advantages. For example, use of a preferred embodiment of the present invention allows for the compensation of a shifting resonance without the addition of a physical damping device. In certain situations, such as MEMS devices, the addition of a physical damping device is very difficult or not possible. Therefore, compensation through non-physical means allows for compensation where it would not have been possible.

Also, the use of a preferred embodiment of the present invention allows for the compensation to be performed computationally. By using computations to generate the compensation, algorithms used to generate the compensation values may be changed to meet changing conditions, permitting much greater flexibility.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Micro-electrical-mechanical systems (MEMS) devices contain mechanical elements, sensors, actuators, and electronics on a common silicon (or similar substance) substrate. All of these elements are fabricated on the silicon substrate using micro-fabrication techniques. MEMS devices make possible complete systems on a chip. The devices augment the computation capabilities of microelectronics with the perception and control capability of microsensors and microactuators.

An example of a MEMS application is micromirrors that can be used for optical switching and routing in fiber optic communications. The micromirrors can be used to route optical information between different optical fibers in the optical domain rather than requiring the conversion of the optical information to electrical information, performing the routing operation, and then reconverting the information back into optical form. The conversion of optical information to electrical information and back to optical information is slow and consumes a considerable amount of power.

The micromirrors, being mechanical devices, have a damping factor and a structural stiffness. The damping factor and the structural stiffness contribute to the micromirror having a resonance at a certain frequency. Resonance is a naturally occurring phenomenon and in many applications, it is not a cause for concern because the resonance frequency is usually far removed from the normal operating frequency of the system. However, if the resonance frequency is close to the operating frequency, steps must be taken to compensate for the resonance.

Traditional techniques such as pole/zero cancellation and notch filters offer good performance when it comes to compensating for the resonance frequency. Unfortunately, these techniques are only effective on resonance frequencies that remain static. In many applications, the actual resonance frequency will change depending on operating temperature, time, and current device position. As the resonance frequency shifts away from the original resonance frequency, the compensation provided by the traditional techniques becomes less effective because the compensation is designed for only a specific frequency and works only within a certain frequency range. If the resonance frequency moves outside the operable frequency range of the compensation, then the compensation is no longer effective.

Figure 1A:
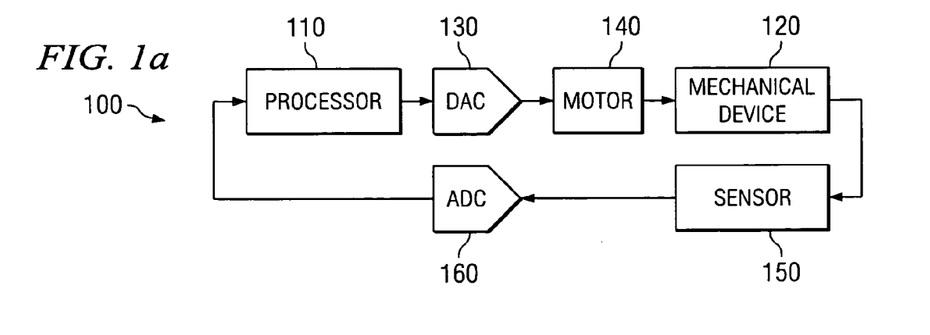
FIG. 1a illustrates a hardware block diagram of a MEMS control system according to a preferred embodiment of the present invention.

Referring now to FIG. 1a, a block diagram displays a view of a MEMS device 100 according to a preferred embodiment of the present invention. For example, according to a preferred embodiment of the present invention, the MEMS device 100 is a micromirror system for use in routing of optical information in communications systems. The MEMS device 100 is controlled by a processor 110 that is responsible for issuing commands to control the position of the mechanical device, such as the micromirror. The processor 110 receives commands for positioning of the micromirror from an external device (not shown) coupled to the MEMS device 100. For example, the external device may be a network routing switch that is responsible for controlling the routing of information. The network routing switch would send commands to the processor 110 which in turn would control the position of the micromirror that performs the actual routing of the optical information. Alternatively, the processor 110 may containing the necessary programming to control the operating of the mechanical device without receiving external commands from an external device.

The processor 110 upon receiving commands from the external device issues commands to perform some operation on a mechanical device 120, for example, moving the position of the micromirror. The commands issued by the processor 110 are typically digital in nature and are converted into an analog equivalent by a digital-to-analog converter (DAC) 130. The analog command is then provided to a motor or some other microactuator 140 to manipulate the mechanical device 120. Referring back to the micromirror example, the processor 110 issues a command to change the position of the micromirror. The command is converted into an analog equivalent and is then provided to a motor that changes the angle of the micromirror.

The feedback portion of the MEMS device 100 is comprised of a sensor 150 and some control and glue logic that is understandably necessary for proper function of the MEMS device 100 but is not shown in FIG. 1. The sensor 150 may be a positional sensor for the micromirror example, or it may be some other form of sensor depending on the application. The sensor 150 provides its information typically in an analog form and therefore requires conversion into a digital form by an analog-to-digital converter (ADC) 160 to be used by the processor 110. Alternatively, an analog implementation of an MEMS device would not require the ADC 160 since any processing will be performed via analog devices. The processor 110 would use the information provided by the sensor 150 to make small adjustments the command it is issuing to the mechanical device to place the micromirror at the desired position.

Figure 1B:
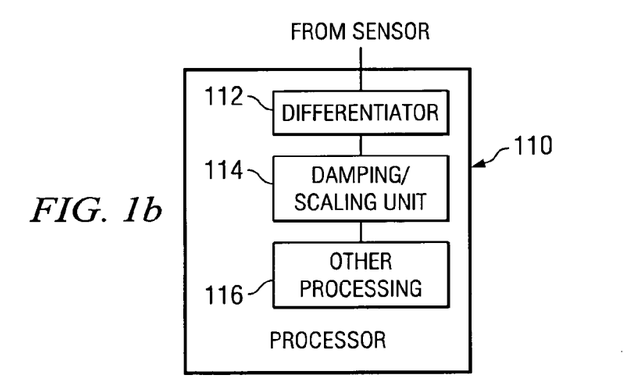
FIG. 1b illustrates a detailed view of a processing unit according to a preferred embodiment of the present invention.

Referring now to FIG. 1b, a block diagram provides a detailed view of a processing unit according to a preferred embodiment of the present invention. The processing unit may be very similar to the processor 110 displayed in FIG. 1a or it may be a different processing unit with specially designed custom implemented functional units. A differentiator 112 (the function of the differentiator will be discussed below) is coupled to a sensor, perhaps similar to the sensor 150 from FIG. 1a. The differentiator 112 filters noise from data provided by the sensor and differentiates the positional data provided by the sensor to provide velocity information regarding the micromirror.

A damping and scaling unit 114 is present to ensure that data provided by the differentiator 112 does not exceed allowable signal ranges. The signal ranges are typically a function of the motor used to manipulate the micromirror and can change depending on the type and model of motor used. The damped and scaled data from the differentiator 112 then undergoes any other necessary processing in an additional processing block 116 prior to being used to make adjustments to the micromirror. The operation of the functional units discussed above will be investigated in further detail below.

An alternative to FIG. 1b exists, wherein the differentiator 112 and the damping and scaling unit 114 are distinct entities existing outside of the processing unit. In this case, the functional units may be custom design logic or programmed programmable logic arrays or some other form of logic.

A common way to design feedback control systems is to work with the Laplace transform and in s-space. Using Laplace transforms, the designer designs filters in s-space and iterates filter parameters until stability criteria are sufficient to provide required control loop performance. Stability criteria typically involve phase and gain margin metrics that can be predicted using frequency domain analysis techniques. The Laplace transform and s-space are well understood concepts to persons of ordinary skill in the art of the present invention.

Figures 2, 3:
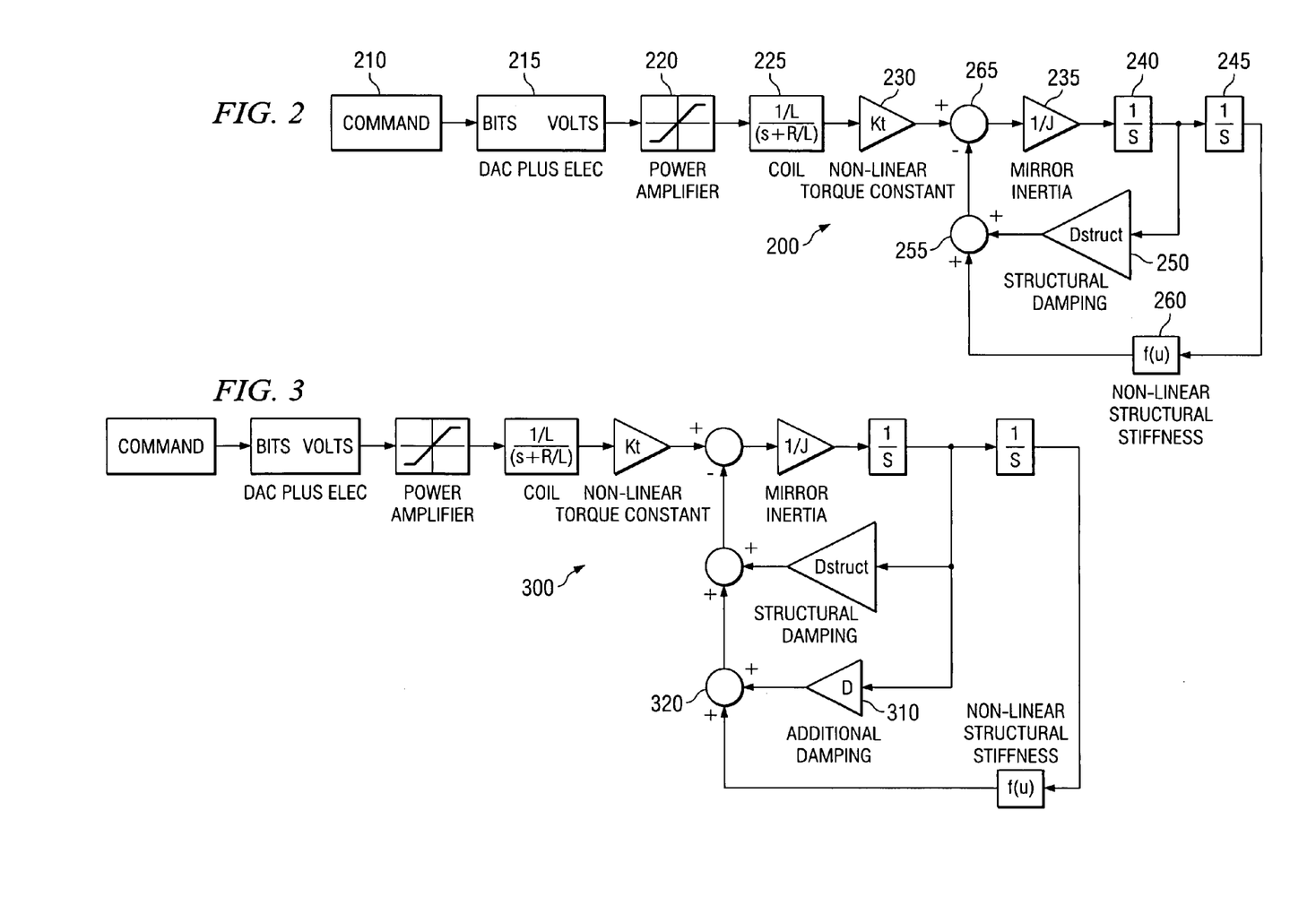
FIG. 2 is an s-space functional block diagram (prior art) of a MEMS system without a feedback control system.
FIG. 3 is an s-space functional block diagram of a MEMS control system with a mechanical damping loop to provide compensation for a shifting resonance.

Referring now to FIG. 2, an s-space diagram displays a prior art implementation of the micromirror MEMS device 200 without a feedback control system. The MEMS device 200 begins with a command unit 210. The command unit 210 may be (or a part of) a dedicated processing unit such as a digital signal processor, a general purpose microprocessor, a micro-controller, or a custom designed application specific integrated circuit. The command unit 210 is responsible for generating commands for controlling the movements and angle of the micromirror, either as directed by an externally connected device or internally located programs.

The command unit 210 may issue its commands in a digital format. It is however possible for a command unit to generate commands in an analog fashion. After the digital command has been issued by the command unit 210, the digital command is converted into an analog equivalent via a digital-to-analog (DAC) converter 215. Digital-to-analog converters are well understood by persons of ordinary skill in the art of the present invention. In some implementations, the DAC 215 converts the digital command in an analog voltage level that is scaled against a specified reference voltage level according to the value of the digital command.

The analog command is then forwarded to a power amplifier 220. The power amplifier 220 also functions to ensure that the analog command does not exceed a maximum voltage value that can be produced by the power amplifier 220 or exceeds the maximum usable voltage supported by a motor used in positioning the micromirror. Should the analog command exceed the maximum, then it is preferred that the analog command be clipped to a value that is equal to the maximum.

The output of the power amplifier 220 is then sent to the motor, whose electrical behavior is displayed in box 225. In the micromirror application, the motor is a micromotor and can be thought of as behaving like a coil. The motor is responsible for moving the micromirror through its range of travel. The electrical behavior of the motor is displayed in the box 225 and is represented as an expression:

$$\frac{\frac{1}{L}}{\left(s+\frac{R}{L}\right)}$$

where R is the electrical resistance of the motor and L is the electrical inductance of the motor. The motor also has a non-linear component. This non-linear component is displayed in FIG. 2 as a multiplicative torque constant 230 and is a function of time. Various types of micromotors exist to position MEMS devices. Capacitive motors use voltage differences between surfaces to generate force. The type of motor employed does not change the present invention.

The micromirror itself has several physical characteristics. One of which is inertia, represented as a multiplicative constant 235. Inertia can be thought of as a tendency for objects that are at rest to remain at rest and objects that are in motion to remain in motion. Newton's Laws of Motion states that the sum of forces acting on an object and the inertia of the object defines the acceleration of the object. The sum of the forces is equal to the inertia of the object multiplied by the acceleration of the object. Three different forces are applied to the micromirror system displayed in FIG. 2. The first force, discussed previously, is force from the micromotor. The other two forces can be classified as retarding forces that are generated by the physical characteristics of structural damping and stiffness.

Structural damping, represented as a multiplicative constant 250, accounts for the physical characteristics of the micromirror structure to absorb energy and therefore the damping of the micromirror is calculated from the micromirror's velocity. The micromirror's velocity is calculated by integrating the acceleration of the micromirror over time. The s-space integration operation is displayed in box 240. The input to the integration operation is acceleration (of the micromirror) and the output of the integration operation is velocity (of the micromirror).

Finally, a third physical characteristic of the micromirror is its structural stiffness, represented as a non-linear function 260. The structural stiffness of the micromirror is calculated from the micromirror's position. The micromirror's position, in turn, is calculated by performing an integration of the micromirror's velocity over time (the s-space integration operation is displayed in box 245).

The micromirror's structural damping and structural stiffness are combined in a summing point 255. The combined structural damping and structural stiffness components are, in turn, combined (in a second summing point 265) with the results of the command produced by the command unit 210 and is used to control the position of the micromirror. In one possible implementation, a voltage level produced by the power amplifier 220 as a direct result of the command issued by the command unit 210 is maintained until the command unit 210 wishes to change the position of the micromirror. Therefore, any changes resulting from the feedback control portion of the MEMS device 200 will result in a change in the voltage level.

As discussed previously, if a physical damping device were added to the micromirror MEMS device, then the problem of the shifting resonance can be readily remedied. The addition of the physical damping device permits the system designer to directly apply conventional feedback control design techniques to provide desired system performance.

Referring now to FIG. 3, an s-space diagram displays a prior art implementation of the micromirror MEMS device 300 with a feedback control system with the addition of a mechanical damping device. The feedback control system of the micromirror MEMS device 300 is identical to the feedback control system displayed in FIG. 2 with the exception of the addition of a mechanical damping device, displayed as a combination of a multiplicative constant 310 and a summing point 320. The addition of the mechanical damping device allows the control system designer to tolerate the shifting resonance. When the shifting resonance moves the resonance frequency outside of the compensation range of the static compensation techniques, the mechanical damping device can compensate for greater fluctuations sensed in the motion of the micromirror by increasing the damping factor (displayed as the multiplicative constant 310) of the feedback loop.

The mechanical damping device discussed in FIG. 3 can also be realized by using non-mechanical techniques. The non-mechanical damping device, referred to as a damping loop block, bases its' damping compensation by detecting the position of the micromirror and using the position to determine a necessary damping. According to a preferred embodiment of the present invention, the damping loop block may be implemented in a processing unit, such as a digital signal processor, a general purpose microprocessor or a custom designed processing unit along with a sensor device.

Figure 4:
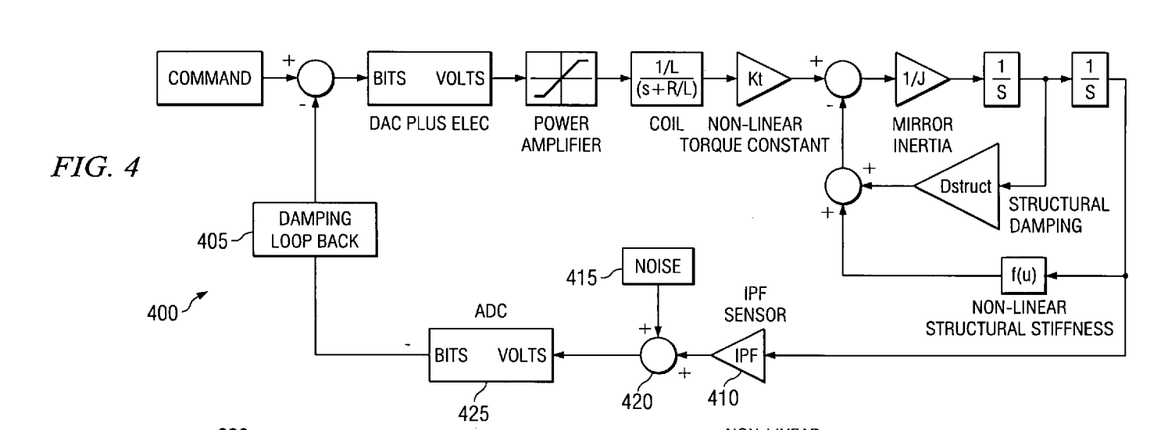
FIG. 4 is an s-space functional block diagram of a MEMS control system with a non-mechanical damping loop to provide compensation for shifting resonance according to a preferred embodiment of the present invention.

Referring now to FIG. 4, an s-space diagram displays an implementation of the micromirror MEMS device 400 with a feedback control system with the addition of a damping loop block 405 according to a preferred embodiment of the present invention. The basic structure of the implementation (with the exception of the damping loop block 405) is identical to the implementation discussed in FIG. 2 and for the sake of brevity, will not be discussed herein.

The damping loop block 405 depends upon the velocity of the micromirror for use in calculating the necessary damping required to compensate for any shift in the resonance frequency. System damping is proportional to velocity. Therefore, to increase system damping some estimate of velocity must be measured or generated. According to a preferred embodiment of the present invention, position information of the micromirror is sensed by an in-package feedback (IPF) sensor (displayed in its functional form as a multiplicative constant 410) and mirror velocity is estimated by filtering the position measurement. The present invention functions equally well with a position, velocity or acceleration sensor. Position sensor data would be differentiated to provide a velocity estimate and acceleration sensor data would be integrated to provide a velocity estimate.

According to a preferred embodiment of the present invention, the sensor is a position sensor (velocity and acceleration sensors will not be directly referenced, but it is understood that the present invention would be fully operable if these sensors were used rather than the positional sensor). The IPF sensor 410 converts positional information of the micromirror into voltage levels that can vary depending on the position of the micromirror. Also displayed in the feedback system 400 is a noise source 415. The noise source 415 is really a part of the s-space model of the IPF sensor 410 and is present to model noise introduced into the system by the IPF sensor 410. The voltage levels generated by the IPF sensor 410 and the noise source 415 are combined by a summing point 420 producing positional information for the micromirror. The positional information is converted into digital data by an analog-to-digital converter (ADC) 425. The functionality of the ADC 425 is well understood by those of ordinary skill in the art of the present invention.

The digital positional information provided by the ADC 425 enters the damping loop block 405. The damping loop block 405 functionally operates as a noise filter and differentiator. The noise filter is used to remove as much of the noise introduced into the positional measurements by a positional sensor, such as the IPF sensor 410 and noise source 415 pair, as possible. The differentiator is used to change the positional information provided by the positional sensor back into acceleration information that is usable to control the micromirror after being combined with output of the command unit.

Figure 5:
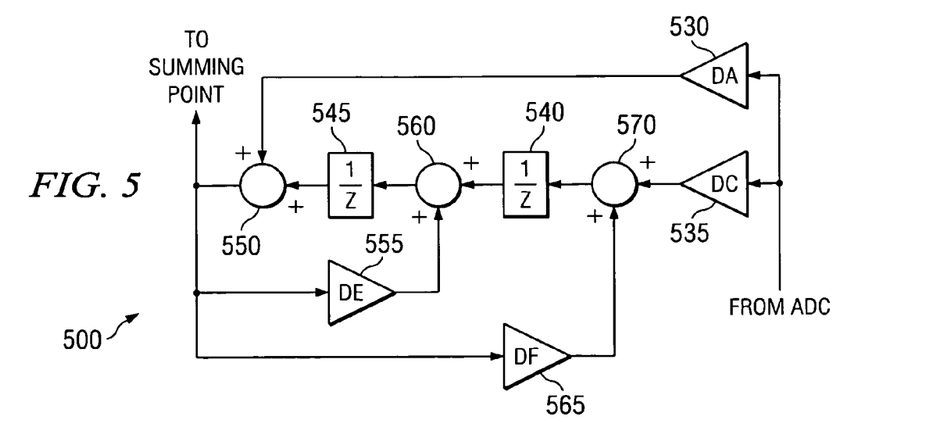
FIG. 5 is a detailed view of the damping loop block according to a preferred embodiment of the present invention.

Referring now to FIG. 5, a diagram illustrates a Z-space representation of the damping loop block 405 according to a preferred embodiment of the present invention. Z-space implementations of filters and differentiators are well understood by those of ordinary skill in the art of the present invention. Examining the damping loop block 405 in greater detail, a series of multipliers 530, 535, 555, and 565, summing points 550, 560, and 570, and delay units 540 and 545 are Z-space functional blocks used to implement the filter and the differentiator. The multipliers and their respective multiplicative constants DA, DC, DE, and DF are coefficients of the filter, while the summing points and the delay units are the differentiator. According to a preferred embodiment of the present invention, the desired filter is a second order filter, as implemented by the two delay units. However, filters of higher and lower order are possible, depending on a desired trade-off between computational complexity and performance.

The damping loop provides information related to the changing position of the micromirror, while the command from the command unit provides information related to the desired position of the micromirror. A summing point combines the two to provide information about how much adjustment needs to be made to the micromirror to bring it into the desired position. By actually considering the position of the micromirror, the control system may be able to detect if the micromirror has overshot the desired position and is able to take steps to compensate. Without accurate position sensing, the control system may not be able to detect if the micromirror has overshot the desired position and may result in a large amount of time prior to the micromirror actually settling down to the desired location.

According to another preferred embodiment of the present invention, the compensation provided by the non-mechanical damping minimizes the effects of the shifting resonance. However, the addition of an extra compensation loop, referred to as a position loop block, that makes further use of the positional information of the micromirror provides a superior measure of performance.

Figure 6:
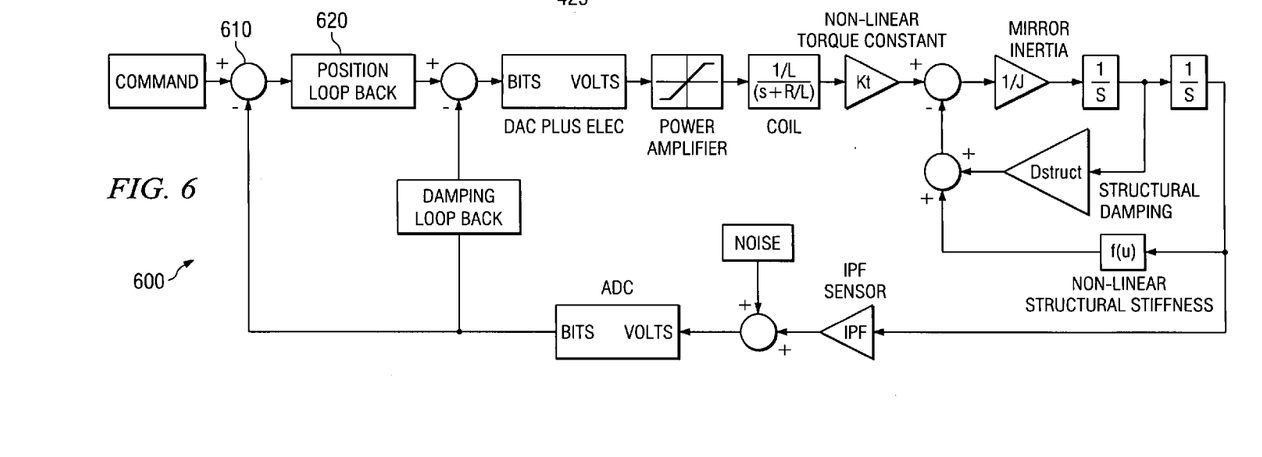
FIG. 6 is an s-space functional block diagram of a MEMS control system with both a non-mechanical damping device and a positional loop block to provide compensation for shifting resonance according to a preferred embodiment of the present invention.

Referring now to FIG. 6, an s-space diagram displays an implementation of the micromirror MEMS device 600 with a feedback control system with the addition of a position loop block 605 according to a preferred embodiment of the present invention. The position loop block 605 makes use of information regarding the position of the micromirror to provide an error signal. The remainder of the diagram displayed in FIG. 6 is identical to the diagram displayed in FIG. 4, and for the sake of brevity will not be discussed.

As discussed previously, the position of the micromirror is detected using a positional sensor and the positional data provided by the positional sensor is provided to a damping loop block (as discussed in FIG. 4). According to a preferred embodiment of the present invention, the positional data, provided by the positional sensor, is also combined with the command generated by the command unit. Alternatively, as discussed previously, other types of sensors (velocity and acceleration) may be used in place of the positional sensor. The command, as generated by the command unit, is the same command that is responsible for currently moving the micromirror. The positional data and the command are combined in a summing point 610. The summing point generates a difference between the command and the positional data this is commonly referred to as an error signal.

The error signal provides a measure of the relative difference between the current position of the micromirror and the desired position of the micromirror. The error signal is then sent to a position loop block 620. The position loop block 620 is similar in function to the damping loop block (discussed in FIG. 4) in that it functions as a noise filter and a differentiator. The position loop block 620 provides a new command that is a combination of the previous command generated by the command unit and the error signal. The output of the position loop block 620 is combined with the output of the damping loop block and is then used to control the motor responsible for moving the micromirror.

Figure 7:
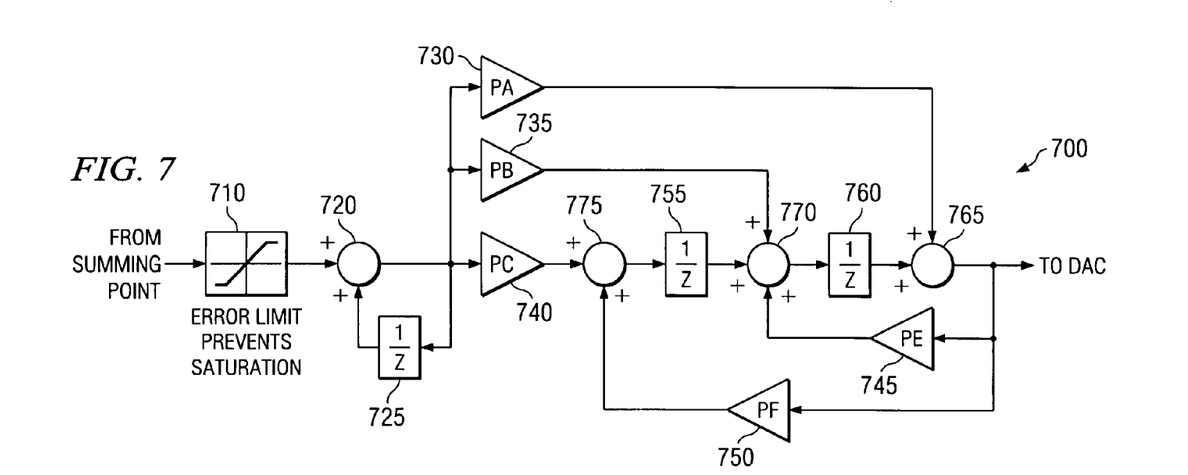
FIG. 7 is a detailed view of the positional loop block according to a preferred embodiment of the present invention.

Referring now to FIG. 7, a diagram illustrates a Z-space representation of the position loop block 620 according to a preferred embodiment of the present invention. Z-space implementations of filters and differentiators are well understood by those of ordinary skill in the art of the present invention. Examining the position loop block 620 in greater detail, a limiter 710 is used to prevent the error signal from exceeding (or saturating) an allowed range of values. A summing point 720 combines the error signal with a delayed version of itself (delay 725). A series of multipliers 730, 735,

740, 745, and 750, summing points 765, 770, and 775, and delay units 755 and 760 are Z-space functional blocks used to implement the filter and the differentiator. The multipliers and their respective multiplicative constants PA, PB, PC, PE, and PF are coefficients of the filter, while the summing points and the delay units are the differentiator. According to a preferred embodiment of the present invention, the desired filter is a third order filter, as implemented by the three delay units. However, filters of higher and lower order are possible, depending on a desired trade-off between computational complexity and performance. The noise filter and differentiator as implemented in the position loop block 620 is a widely known and used control system component. It is commonly referred to as a proportional, integral, derivative (PID) device and is well known to persons of ordinary skill in the art of the present invention.

According to a preferred embodiment of the present invention, the additional damping provided by the damping loop is performed in the digital domain by modifying the micromirror position commands issued by the command unit. However, the additional damping can also be performed using analog voltage values.

Figure 8:
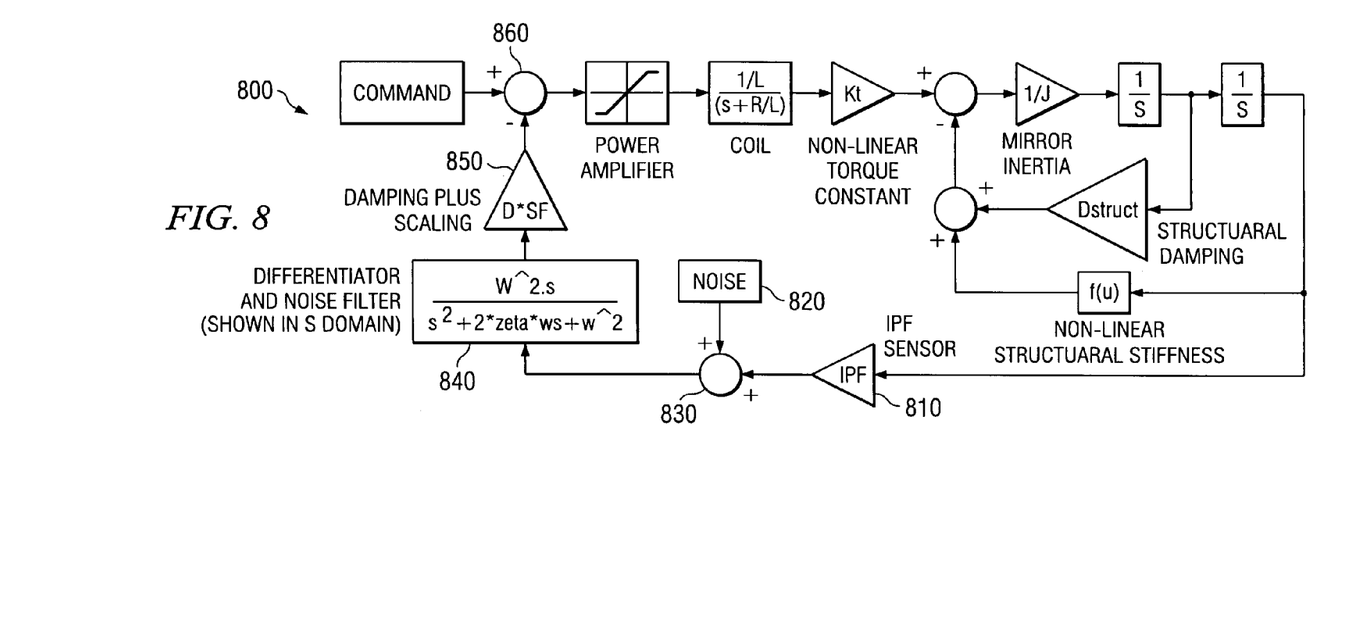
FIG. 8 is an s-space functional block diagram displaying an analog implementation of a non-mechanical damping device according to a preferred embodiment of the present invention.

Referring now to FIG. 8, an s-space diagram illustrates an implementation of the micromirror MEMS device 800 with a feedback control system with the addition of an analog non-mechanical damping device according to a preferred embodiment of the present invention. The analog non-mechanical damping device begins in a fashion that is similar to the digital version, with a positional sensor 810 providing voltage values corresponding to the position of the micromirror. A noise generator 820 provides a modeled noise source representation of an actual positional sensor. The voltage levels generated by the positional sensor 810 and the noise generator 820 are combined in a summing point 830. The summing point 830 provides a voltage level that corresponds to the position of the micromirror.

The position of the micromirror (as represented by the voltage level) is forwarded to a differentiator and noise filter 840. The purpose of the differentiator and the noise filter 840 is to filter out the noise introduced by the noise generator 820 and to differentiate the positional information provided by the positional sensor. The differentiator and noise filter 840 is a dual to the damping loop block in the digital version of the damping loop. After being differentiated and filtered, the positional information is scaled in a damping-scaling unit 850. This is followed by adding the result with an analog version of the command issued by the command unit. The remainder of the MEMS device is identical to the MEMS device with a digital damping loop.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A control method for a system with a shifting resonance point comprising:
    issuing a command to manipulate a mechanical device;
    detecting physical information of the mechanical device;
    computing a compensation value based on the detected physical information;
    differentiates the compensation value and preventing the differential compensation value from exceeding a predetermined value;
    combining the differentiated compensation with the command; and
    manipulating the mechanical device based on the combined command.

2. The method of claim 1, wherein the physical information is position, velocity, or acceleration information of the mechanical device.

3. The method of claim 2, wherein the physical information is detected by a sensor.

4. The method of claim 1, wherein the issued command is issued by a processing unit.

5. The method of claim 4, wherein the issuing step comprises:
    converting the issued command into an analog representation; and
    converting the analog representation into a voltage value.

6. The method of claim 1, wherein the detecting step comprises:
    using a sensor to detect the physical information of the mechanical device; and
    converting a voltage value produced by the sensor into a digital equivalent.

7. The method of claim 1, wherein the computing step comprises:
    filtering the detected physical information; and
    producing the compensation value.

8. The method of claim 7, wherein the filtering is performed by a second order filter.

9. The method of claim 7, wherein the computing step is performed with analog signals.

10. The method of claim 7, wherein the computing step is performed with digital signals.

11. The method of claim 1, wherein the combining step comprises adding the compensation value generated in the computing step with the command.

12. The method of claim 11, wherein the adding is binary arithmetic.

13. The method of claim 1, wherein the mechanical device is a micromirror in a micro-electrical-mechanical system (MEMS).

14. The method of claim 1, wherein the physical information is position information of the mechanical device, and the computing step comprises:
    filtering the detected position;
    differentiating the filtered position data; and
    producing the compensation value.

15. A control method for a system with a shifting resonance point comprising:
    issuing a command to manipulate a mechanical device;
    detecting physical information of the mechanical device;
    computing a compensation value based on the detected physical information;
    combining the computed compensation with the command; and
    manipulating the mechanical device based on the combined command,
    wherein the computing step comprises:
    filtering the detected physical information; and
    producing the compensation value,
    wherein the computing step further comprises:
    producing an error signal;
    filtering the error signal with a second filter;
    differentiating the filtered error signal with a second differentiator; and
    replacing the command with the differentiated and filtered error signal.

16. The method of claim 15, wherein the filtering is performed by a third order filter.

17. The method of claim 15, wherein the error signal is a difference between the command and the detected position.

18. A control method for a system with a shifting resonance point comprising:
- issuing a command to manipulate a mechanical device;
- detecting physical information of the mechanical device;
- computing a compensation value based on the detected physical information;
- combining the computed compensation with the command; and
- manipulating the mechanical device based on the combined command, wherein the physical information is position information of the mechanical device, and the computing step comprises:
- filtering the detected position;
- differentiating the filtered position data; and
- producing the compensation value, wherein the computing step further comprises:
- producing an error signal;
- filtering the error signal with a second filter;
- differentiating the filtered error signal with a second differentiator; and
- replacing the command with the differentiated and filtered error signal.

19. A circuit for controlling a system with a shifting resonance comprising:
- a processor, the processor containing circuitry to issue commands for controlling the functionality of the system;
- an actuator coupled to the processor, the actuator containing circuitry to respond to the commands issued by the processor;
- a physical device coupled to the actuator;
- a sensor coupled to the physical device and the processor, the sensor containing circuitry to detect physical information regarding the physical device and forwarding the detected physical information to the processor;
- a differentiator coupled to the sensor, the differentiator containing circuitry to differentiate and filter signals provided by the sensor; and
- a damping-scaling unit coupled to the differentiator, the damping-scaling unit containing circuitry to ensure that signals from the differentiator does not exceed a permitted range of signals and to provide an additional damping factor to the signal to rapidly control the physical device.

20. The circuit of claim 19, wherein the physical device is a micromirror.

21. The circuit of claim 20, wherein the sensor is a positional sensor and senses the position of the micromirror.

22. The circuit of claim 20, wherein the sensor is a velocity sensor and senses the velocity of the micromirror.

23. The circuit of claim 20, wherein the sensor is an acceleration sensor and senses the acceleration of the micromirror.

24. The circuit of claim 19, wherein the differentiator and the damping-scaling unit are analog circuits and operate on analog voltage values generated by the sensor.

25. The circuit of claim 19, wherein the circuit further comprising:
- a digital-to-analog converter coupled to the processor and the actuator, the digital-to-analog converter containing circuitry to convert digital commands to an analog equivalent that can be applied to the actuator; and
- an analog-to-digital converter coupled to the sensor and the differentiator, the analog-to-digital converter containing circuitry to convert the voltage levels generated by the sensor into a digital equivalent that is usable by the processor.

26. The circuit of claim 25, wherein the differentiator and the damping-scaling unit are functional units in the processor.

* * * * *